United States Patent
Braga et al.

(10) Patent No.: US 9,361,887 B1
(45) Date of Patent: Jun. 7, 2016

(54) SYSTEM AND METHOD FOR PROVIDING WORDS OR PHRASES TO BE UTTERED BY MEMBERS OF A CROWD AND PROCESSING THE UTTERANCES IN CROWD-SOURCED CAMPAIGNS TO FACILITATE SPEECH ANALYSIS

(71) Applicant: VOICEBOX TECHNOLOGIES CORPORATION, Bellevue, WA (US)

(72) Inventors: Daniela Braga, Bellevue, WA (US); Faraz Romani, Renton, WA (US); Ahmad Khamis Elshenawy, Lynnwood, WA (US); Michael Kennewick, Bellevue, WA (US)

(73) Assignee: VoiceBox Technologies Corporation, Bellevue, WA (US)

( * ) Notice: Subject to any disclaimer, the term of this patent is extended or adjusted under 35 U.S.C. 154(b) by 0 days.

(21) Appl. No.: 14/846,925

(22) Filed: Sep. 7, 2015

(51) Int. Cl.
G10L 15/26 (2006.01)
G10L 15/06 (2013.01)

(52) U.S. Cl.
CPC ............... *G10L 15/26* (2013.01); *G10L 15/063* (2013.01)

(58) Field of Classification Search
CPC . G06F 17/30861; G06F 21/552; G06F 21/00; G06F 17/30864; G06F 8/30; G06F 21/33; G06F 9/44521; G06F 9/45512; G06F 17/27; G10L 17/00; G10L 17/005; G10L 17/22; G06Q 30/0603; G06Q 21/10
USPC ............... 704/1–10, 235, 243–245, 250, 255, 704/251, 257, 270, 278; 705/52; 726/29
See application file for complete search history.

(56) References Cited

U.S. PATENT DOCUMENTS

| | | | |
|---|---|---|---|
| 7,197,459 B1 | 3/2007 | Harinarayan | |
| 8,925,057 B1 | 12/2014 | Ansari | |
| 2004/0093220 A1* | 5/2004 | Kirby | G06F 17/27 704/278 |
| 2007/0265971 A1* | 11/2007 | Smalley | G06Q 30/0603 705/52 |
| 2009/0150983 A1 | 6/2009 | Saxena | |
| 2012/0066773 A1* | 3/2012 | Weisberger | G06F 21/10 726/29 |
| 2012/0254971 A1 | 10/2012 | Hu | |
| 2013/0231917 A1 | 9/2013 | Naik | |
| 2013/0262114 A1 | 10/2013 | Brockett | |
| 2014/0156259 A1 | 6/2014 | Dolan | |

(Continued)

OTHER PUBLICATIONS

Bontcheva, Kalina, et al. "Crowdsourcing Named Entity Recognition and Entity Linking Corpora", Handbook of Linguistic Annotation, Springer, 2014, 18 pages.

(Continued)

*Primary Examiner* — Huyen Vo
(74) *Attorney, Agent, or Firm* — Sheppard Mullin Richter & Hampton LLP

(57) ABSTRACT

Systems and methods of providing text related to utterances, and gathering voice data in response to the text are provide herein. In various implementations, an identification token that identifies a first file for a voice data collection campaign, and a second file for a session script may be received from a natural language processing training device. The first file and the second file may be used to configure the mobile application to display a sequence of screens, each of the sequence of screens containing text of at least one utterance specified in the voice data collection campaign. Voice data may be received from the natural language processing training device in response to user interaction with the text of the at least one utterance. The voice data and the text may be stored in a transcription library.

19 Claims, 9 Drawing Sheets

(56) References Cited

U.S. PATENT DOCUMENTS

2014/0244254 A1 8/2014 Ju
2015/0006178 A1 1/2015 Peng
2015/0095031 A1 4/2015 Conkie

OTHER PUBLICATIONS

Braunschweig, Katrin, et al., "Enhancing Named Entity Extraction by Effectively Incorporating the Crowd", BTW Workshops, 2013, pp. 181-195.
Buchholz, Sabine, et al., "Crowdsourcing Preference Tests, and How to Detect Cheating", in Interspeech 2011, 8 pages.
Carmel, David, et al., "ERD\14: Entity Recognition and Disambiguation Challenge", ACM SIGIR Forum, vol. 48, No. 2, 2014, pp. 63-77.
Derczynski, Leon, et al., "Analysis of Named Entity Recognition and Linking for Tweets", Information Processing & Management, vol. 51, No. 2, 2015, pp. 32-49.
Eickhoff, C. et al., "Increasing Cheat Robustness of Crowdsourcing Tasks", Information Retrieval, vol. 16, No. 2, 2013, 18 pages.
Eickhoff, Carsten, "How Crowdsourcable is Your Task?", Proceedings of the Workshop on Crowdsourcing for Search and Data Mining, Feb. 9, 2011, pp. 11-14.
Finin, Tim, et al., "Annotating Named Entities in Twitter Data With Crowdsourcing", Proceedings of the NAACL HLT 2010 Workshop on Creating Speech and Language Data With Amazon \s Mechanical Turk, Association for Computational Linguistics, Jun. 2010, pp. 80-88.
Gadiraju, Ujwal, et al., "Understanding Malicious Behavior in Crowdsourcing Platforms: The Case of Online Surveys", CHI 2015—Conference on Human Factors in Computing Systems, Seoul, South Korea, Apr. 18, 2015, 10 pages.
Gennaro, Rosario, et al., "Non-Interactive Verifiable Computing: Outsourcing Computation to Untrusted Workers", Advances in Cryptology—CRYPTO 2010, Springer Berlin Heidelberg, 2010, 19 pages.
Hsueh, Pei-Yun, et al., "Data Quality from Crowdsourcing: A Study of Annotation Selection Criteria", Proceedings of the NAACL HLT Workshop on Active Learning for Natural Language Processing, Boulder, Colorado, Jun. 2009, pp. 27-35.
Ipeirotis, Panagiotis G., "Quality Management on Amazon Mechanical Turk", Proceedings of the ACM SIGKDD Workshop on Human Computation, ACM, Jul. 2010, pp. 64-67.
Kaufmann, Nicolas, et al., "More Than Fun and Money. Worker Motivation in Crowdsourcing—A Study on Mechanical Turk", Proceedings of the Seventeenth Americas Conference on Information Systems, AMCIS, vol. 11, Aug. 4, 2011, pp. 1-11.
Lawson, Nolan, et al., "Annotation Large Email Datasets for Named Entity Recognition with Mechanical Turk", Proceedings of the NAACL HLT 2010 Workshop on Creating Speech and Language Data With Amazon\s Mechanical Turk, Association for Computational Linguistics, Jun. 2010, pp. 71-79.
Levenshtein, V., I., Binary Codes Capable of Correcting Deletions, Insertions, and Reversals, Soviet Physics-Doklady, vol. 10, No. 8, Feb. 1966, pp. 707-710.
Oleson, David, et al., "Programmatic Gold: Targeted and Scalable Quality Assurance in Crowdsourcing", Human Computation, Papers from the 2011 AAAI Workshop (WS-11-11), vol. 11, 2011, 6 pages.
Rutherford, Attapol T., et al., "Pronunciation Learning for Named-Entities Through Crowd-Sourcing", Proceedings of the 15th Annual Conference on the International Speech Communication Association, 2015, 5 pages.
Sabou, M. et al., "Crowdsourcing Research Opportunities: Lessons from Natural Language Processing", iKnow 2012—Proceedings of the 12th International Conference on Knowledge Management and Knowledge Technologies, Graz, Austria, Article 17, Sep. 5, 2012, 8 pages.
Sabou, Marta, et al., "Corpus Annotation through Crowdsourcing: Towards Best Practice Guidelines", Proceedings of the 9th International Conference on Language Resources and Evaluation , Reykjavik, Iceland, 2014, 8 pages.
Soleymani, Mohammad, et al., "Crowdsourcing for Affective Annotation of Video: Development of a Viewer-Reported Boredom Corpus", Proceedings of the ACM SIGIR 2010 Workshop on Crowdsourcing for Search Evaluation, Jul. 19, 2010, pp. 4-8.
Voyer, Robert, et al., "A Hybrid Model for Annotating Named Entity Training Corpora", Proceedings of the Fourth Linguistic Annotation Workshop, Association for Computational Linguistics, Jul. 15, 2010, pp. 243-246.
Wang, Gang, et al., Serf and Turf: Crowdturfing for Fun and Profit, Proceedings of the WWW, New York, Apr. 16, 2012, pp. 679-688.
Amazon, "Amazon Mechanical Turk API Reference", API Version Mar. 25, 2012, available at: http://awsdocs.s3.amazonaws.com/MechTurk/20120325/amt-API-20120325.pdf, 234 pages.
Amazon, "Amazon Mechanical Turk Developer Guide", API Version Mar. 25, 2012, available at: http://awsdocs.s3.amazonaws.com/MechTurk/20120325/amt-dgi-20120325.pdf, 43 pages.
Amazon, "Amazon Mechanical Turk Getting Started Guide", API Version Mar. 25, 2012, available at http://awsdocs.s3.amazonaws.com/MechTurk/20120325/amt-gsg-20120325.pdf, 36 pages.
Amazon, "Amazon Mechanical Turk Requester UI Guide", API Version Mar. 25, 2012, available at http://awsdocs.s3.amazonaws.com/MechTurk/20120325/amt-ui-20120325.pdf, 59 pages.
Badenhorst, Jaco, et al., "Quality Measurements for Mobile Data Collection in the Developing World", SLTU, 2012, 7 pages.
Callison-Burch, Chris, et al., "Creating speech and language data with Amazon's Mechanical Turk", Proceedings of the NAACL HLT 2010 Workshop on Creating Speech and Language Data with Amazon's Mechanical Turk, Association for Computational Linguistics, 2010, 12 pages.
De Vries, Nic J., et al., "A Smartphone-Based ASR Data Collection Tool for Under-Resourced Languages", Speech Communication, vol. 56, 2014, pp. 119-131.
Draxler, Christoph, "Interfaces for Crowdsourcing Platforms", from "Crowdsourcing for Speech Processing: Applications to Data Collection, Transcription, and Assessment", Chapter 9, pp. 241-278, John Wiley & Sons, 2013, 48 pages.
Freitas, Joao, et al., "Crowd-sourcing Platform for Large-Scale Speech Data Collection", Proc. FALA, 2010, 4 pages.
Hughes, Thad, et al., "Building Transcribed Speech Corpora Quickly and Cheaply for Many Languages", Interspeech, 2010, 4 pages.
Liu, Sean, et al., "A Collective Data Generation Method for Speech Language Models", Spoken Language Technology Workshop (SLT), 2010 IEEE, IEEE, 2010, 6 pages.
McGraw, "Collecting Speech from Crowds", from "Crowdsourcing for Speech Processing: Applications to Data Collection, Transcription, and Assessment", Chapter 3, pp. 37-71, John Wiley & Sons, 2013, 44 pages.
McGraw, Ian, et al., "Collecting Voices from the Cloud", LREC, 2010, 8 pages.
McGraw, Ian, et al., "How to Control and Utilize Crowd-Collected Speech", from "Crowdsourcing for Speech Processing: Applications to Data Collection, Transcription, and Assessment", Chapter 5, pp. 106-136, John Wiley & Sons, 2013, 40 pages.
McGraw, Ian Carmichael, "Crowd-Supervised Training of Spoken Language Systems", Dissertation, Massachusetts Institute of Technology, 2012, 166 pages.

* cited by examiner

SYSTEM AND METHOD FOR PROVIDING WORDS OR PHRASES TO BE UTTERED BY MEMBERS OF A CROWD AND PROCESSING THE UTTERANCES IN CROWD-SOURCED CAMPAIGNS TO FACILITATE SPEECH ANALYSIS

FIELD OF THE INVENTION

The field of the invention relates to collecting natural language content for natural language content transcriptions, and creating and distributing voice data collection campaigns and session scripts that allow natural language processing trainers to provide voice data used for natural language transcriptions.

BACKGROUND OF THE INVENTION

By translating voice data into text, speech recognition has played an important part in many Natural Language Processing (NLP) technologies. For instance, speech recognition has proven useful to technologies involving vehicles (e.g., in-car speech recognition systems), technologies involving health care, technologies involving the military and/or law enforcement, technologies involving telephony, and technologies that assist people with disabilities. Speech recognition systems are often trained and deployed to end-users.

The end-user deployment phase typically includes using a trained acoustic model to identify text in voice data provided by end-users. The training phase typically involves training an acoustic model in the speech recognition system to recognize text in voice data. The training phase often includes capturing the voice data, transcribing the voice data into text, and storing pairs of voice data and text in transcription libraries. Capturing voice data in the training phase typically involves collecting different syllables, words, and/or phrases commonly used in speech. Depending on the context, these utterances may form the basis of commands to a computer system, requests to gather information, portions of dictations, or other end-user actions.

Conventionally, NLP systems captured voice data using teams of trained Natural Language Processing (NLP) trainers who were housed in a recording studio or other facility having audio recording equipment therein. The voice data capture process often involved providing the NLP trainers with a list of utterances, and recording the utterances using the audio recording equipment. Teams of trained transcribers in dedicated transcription facilities typically listened to the utterances, and manually transcribed the utterances into text.

Though useful, conventional NLP systems have problems accommodating the wide variety of utterances present in a given language. More specifically, teams of trained NLP trainers may not be able to generate the wide variety of syllables, words, phrases, etc. that are used in many technological contexts. Moreover, conventional recording studios and/or audio recording equipment are often not cost-effective to deploy on a large scale. Additionally, attempts to distribute collection of voice data to untrained NLP trainers often results in noise (inaccuracies, spam, etc.) being added to the voice data. As a result, it is often difficult to cost-effectively collect voice data with conventional NLP systems. It would be desirable to provide systems and methods that effectively collect voice data for NLP technologies without significant noise.

SUMMARY OF THE INVENTION

Systems and methods of providing text related to utterances, and gathering voice data in response to the text are provide herein. In various implementations, an identification token that identifies a first file for a voice data collection campaign, and a second file for a session script may be received from a natural language processing training device. The first file and the second file may be used to configure the mobile application to display a sequence of screens, each of the sequence of screens containing text of at least one utterance specified in the voice data collection campaign. Voice data may be received from the natural language processing training device in response to user interaction with the text of the at least one utterance. The voice data and the text may be stored in a transcription library.

In some implementations, a first filename corresponding to the first file may be gathered. A second filename corresponding to the second file may further be gathered. The identification token may be created using the first filename and the second filename.

In some implementations, identification token comprises an alphanumeric character string. The identification token may comprise a concatenation of the first portion and the second portion. One or more of the first file and the second file may comprise a JavaScript Object Notation (JSON) file.

In some implementations, the utterance comprises one or more of a syllable, a word, a phrase, or a variant thereof. The user interaction may comprise a selection of a touch-screen button instructing the mobile application to record the voice data.

The natural language processing training device may comprise one or more of a mobile phone, a tablet computing device, a laptop, and a desktop. The voice data collection campaign may be configured to collect demographic information related to a user of the natural language processing training device.

DETAILED DESCRIPTION

The system and method described herein measures and assures high quality when performing large-scale crowdsourcing data collections for acoustic model training. The system and method may mitigate different types of spam encountered while collecting and validating speech audio from unmanaged crowds. The system and method may provide, to a mobile application executing on a client device, prompts of utterances to be uttered. The mobile application may collect audio from crowd members and control conditions of the audio collection. Crowd members may be compensated for completing their prompts. An example of a mobile application for collecting utterances is described in U.S. patent application Ser. No. 14/846,926, filed on Sep. 7, 2015, entitled "SYSTEM AND METHOD OF RECORDING UTTERANCES USING UNMANAGED CROWDS FOR NATURAL LANGUAGE PROCESSING," the entirety of which is hereby incorporated herein in its entirety.

The recordings may be validated using a two-step validation process which ensures that workers are paid only when they have actually used our application to complete their tasks. For example, the collected audio may be run through a second crowdsourcing job designed to validate that the speech matches the text with which the speakers were prompted. For the validation task, gold-standard test questions are used in combination with expected answer distribution rules and monitoring of worker activity levels over time to detect and expel likely spammers. Inter-annotator agreement is used to ensure high confidence of validated judgments. This process yielded millions of recordings with matching transcriptions in American English. The resulting set is 96% accurate with only minor errors. An example of a the validation process is described in U.S. patent application Ser. No. 14/846,935, filed on Sep. 7, 2015, entitled "SYSTEM AND METHOD FOR VALIDATING NATURAL LANGUAGE CONTENT USING CROWDSOURCED VALIDATION JOBS," the entirety of which is hereby incorporated herein in its entirety.

Example of a System Architecture

The Structures of the Natural Language Processing Environment 100

Figure 1:
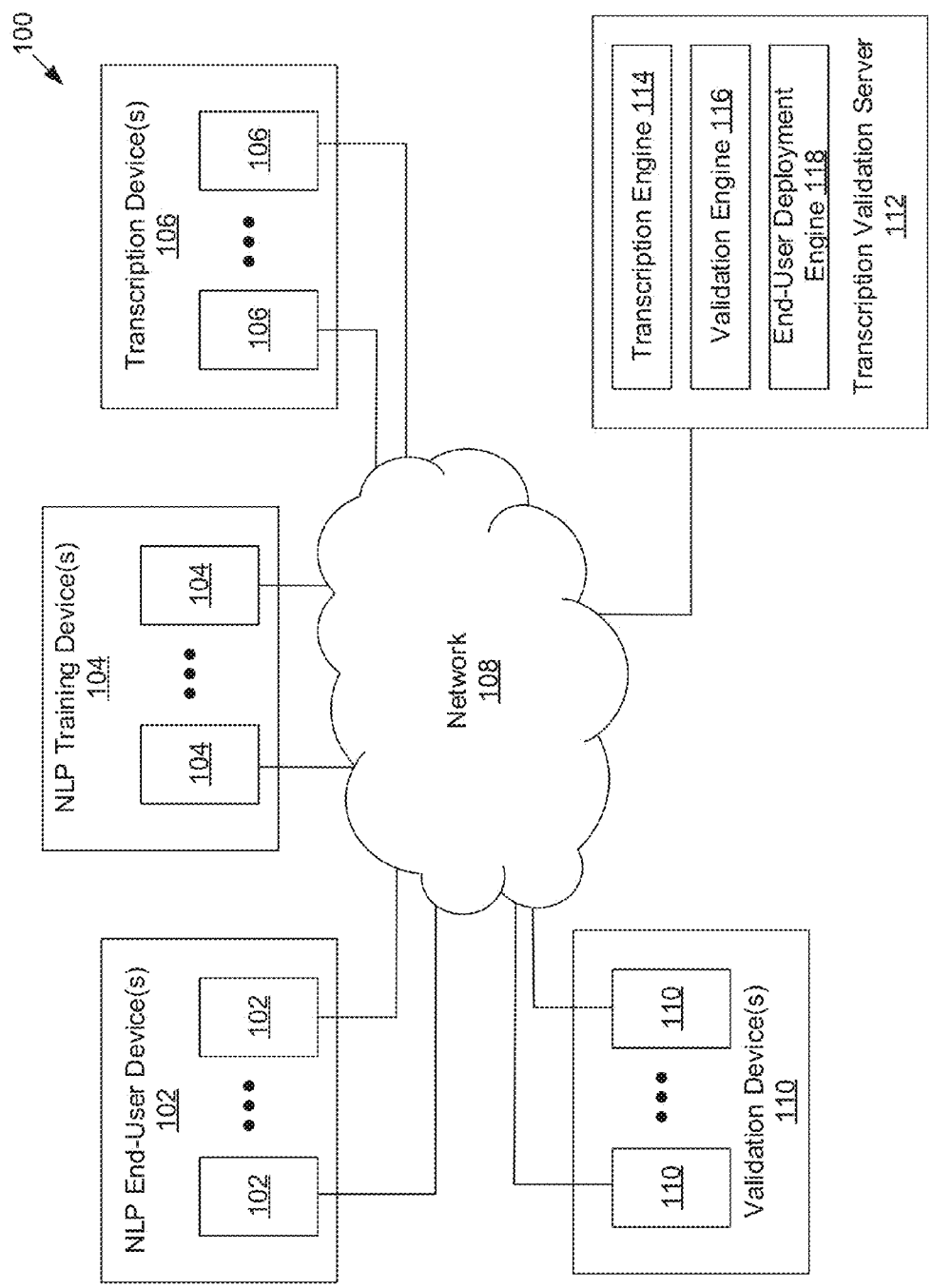
FIG. 1 illustrates a block diagram of a natural language processing environment, according to some implementations.

FIG. 1 illustrates a block diagram of a natural language processing environment 100, according to some implementations. The natural language processing environment 100 may include Natural Language Processing (NLP) end-user device(s) 102, NLP training device(s) 104, transcription device(s) 106, a network 108, validation device(s) 110, and a transcription validation server 112. The NLP end-user device(s) 102, the NLP training device(s) 104, the transcription device(s) 106, the validation device(s) 110, and the transcription validation server 112 are shown coupled to the network 108.

The NLP end-user device(s) 102 may include one or more digital devices configured to provide an end-user with natural language transcription services. A "natural language transcription service," as used herein, may include a service that converts audio contents into a textual format. A natural language transcription service may recognize words in audio contents, and may provide an end-user with a textual representation of those words. The natural language transcription service may be incorporated into an application, process, or run-time element that is executed on the NLP end-user device(s) 102. In an implementation, the natural language transcription service is incorporated into a mobile application that executes on the NLP end-user device(s) 102 or a process maintained by the operating system of the NLP end-user device(s) 102. In various implementations, the natural language transcription service may be incorporated into applications, processes, run-time elements, etc. related to technologies involving vehicles, technologies involving health care, technologies involving the military and/or law enforcement, technologies involving telephony, technologies that assist people with disabilities, etc. The natural language transcription service may be supported by the transcription device(s) 106, the validation device(s) 110, and the transcription validation server 112, as discussed further herein.

The NLP end-user device(s) 102 may include components, such as memory and one or more processors, of a computer system. The memory may further include a physical memory device that stores instructions, such as the instructions referenced herein. The NLP end-user device(s) 102 may include one or more audio input components (e.g., one or more microphones), one or more display components (e.g., one or more screens), one or more audio output components (e.g., one or more speakers), etc. In some implementations, the audio input components of the NLP end-user device(s) 102 may receive audio content from an end-user, the display components of the NLP end-user device(s) 102 may display text corresponding to transcriptions of the audio contents, and the audio output components of the NLP end-user device(s) 102 may play audio contents to the end-user. It is noted that in various implementations, however, the NLP end-user device(s) 102 need not display transcribed audio contents, and may use transcribed audio contents in other ways, such as to provide commands that are not displayed on the NLP end-user device(s) 102, use application functionalities that are not displayed on the NLP end-user device(s) 102, etc. The NLP end-user device(s) 102 may include one or more of a networked phone, a tablet computing device, a laptop computer, a desktop computer, a server, or some combination thereof.

The NLP training device(s) 104 may include one or more digital device(s) configured to receive voice data from an NLP trainer. An "NLP trainer," as used herein, may refer to a person who provides voice data during a training phase of the natural language processing environment 100. The voice data provided by the NLP trainer may be used as the basis of transcription libraries that are used during an end-user deployment phase of the natural language processing environment 100. The NLP training device(s) 104 may include components, such as memory and one or more processors, of a computer system. The memory may further include a physical memory device that stores instructions, such as the instructions referenced herein. The NLP training device(s) 104 may include one or more audio input components (e.g., one or more microphones), one or more display components (e.g., one or more screens), one or more audio output components (e.g., one or more speakers), etc. The NLP training device(s) 104 may support a mobile application, process, etc. that is used to capture voice data during the training phase of the natural language processing environment 100. The NLP end-user device(s) 102 may include one or more of a networked phone, a tablet computing device, a laptop computer, a desktop computer, a server, or some combination thereof.

In some implementations, the mobile application, process, etc. on the NLP training device(s) 104 supports a sequence of screens that allow a NLP trainer (e.g., a person operating the NLP training device(s) 104) to view utterances and to record voice data corresponding to those utterances. The NLP training device(s) 104 may correspond to recording devices discussed in U.S. patent application Ser. No. 14/846,926, entitled, "SYSTEM AND METHOD OF RECORDING UTTERANCES USING UNMANAGED CROWDS FOR NATURAL LANGUAGE PROCESSING," which is hereby incorporated by reference herein.

The transcription device(s) 106 may include one or more digital devices configured to support natural language transcription services. The transcription device(s) 106 may receive transcription job data from the transcription validation server 112. A "transcription job," as described herein, may refer to a request to transcribe audio content into text. "Transcription job data" may refer to data related to a completed transcription job. Transcription job data may include audio content that is to be transcribed, as well as other information (transcription timelines, formats of text output files, etc.) related to transcription. The transcription device(s) 106 may further provide transcription job data, such as text related to a transcription of audio contents, to the transcription validation server 112. In some implementations, the transcription device(s) 106 gather voice data from the NLP training device(s) 104 during a training phase of the natural language processing environment 100.

In some implementations, the transcription device(s) 106 implement crowdsourced transcription processes. In these implementations, an application or process executing on the transcription device(s) 106 may receive transcription job data from the transcription validation server 112 (e.g., from the transcription engine 114). The transcription job data may specify particular items of audio content an end-user is to transcribe. The transcribers need not, but may, be trained transcribers.

In various implementations, the transcription device(s) 106 comprise digital devices that perform transcription jobs using dedicated transcribers. In these implementations, the transcription device(s) 106 may comprise networked phone(s), tablet computing device(s), laptop computer(s), desktop computer(s), etc. that are operated by trained transcribers. As an example of these implementations, the transcription device(s) 106 may include computer terminals in a transcription facility that are operated by trained transcription teams.

The network 108 may comprise any computer network. The network 108 may include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the web and is coupled to the Internet. The physical connections of the Internet and the protocols and communication procedures of the Internet and the web are well known to those of skill in the relevant art. In various implementations, the network 108 may be implemented as a computer-readable medium, such as a bus, that couples components of a single computer together. For illustrative purposes, it is assumed the network 108 broadly includes, as understood from relevant context, anything from a minimalist coupling of the components illustrated in the example of FIG. 1, to every component of the Internet and networks coupled to the Internet.

In various implementations, the network 108 may include technologies such as Ethernet, 802.11, worldwide interoperability for microwave access (WiMAX), 3G, 4G, CDMA, GSM, LTE, digital subscriber line (DSL), etc. The network 108 may further include networking protocols such as multi-protocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 108 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec). In some implementations, the network 108 comprises secure portions. The secure portions of the network 108 may correspond to a networked resources managed by an enterprise, networked resources that reside behind a specific gateway/router/switch, networked resources associated with a specific Internet domain name, and/or networked resources managed by a common Information Technology ("IT") unit.

The validation device(s) 110 may include one or more digital devices configured to validate natural language transcriptions. The validation device(s) 110 may receive validation job data from the transcription validation server 112 (e.g., from the validation engine 116). A "validation job," as used herein, may refer to a request to verify the outcome of a transcription job. "Validation job data" or a "validation unit," as described herein, may refer to data related to a crowdsourced validation job. In various implementations, the validation device(s) 110 implement crowdsourced validation processes. A "crowdsourced validation process," as described herein, may include a process that distributes a plurality of validation jobs to a plurality of validators. The validation device(s) 110 may correspond to the validation devices described in U.S. patent application Ser. No. 14/846,935, entitled, "SYSTEM AND METHOD FOR VALIDATING NATURAL LANGUAGE CONTENT USING CROWD-SOURCED VALIDATION JOBS," which is hereby incorporated by reference herein.

The transcription validation server 112 may comprise one or more digital devices configured to support natural language transcription services. The transcription validation server 112 may include a transcription engine 114, a validation engine 116, and an end-user deployment engine 118.

The transcription engine 114 may transcribe voice data into text during a training phase of the natural language processing environment 100. More specifically, the transcription engine 114 may collect audio content from the NLP training device(s) 104, and may create and/or manage transcription jobs. The transcription engine 114 may further receive transcription job data related to transcription jobs from the transcription device(s) 106. According to various implementations disclosed herein, the transcription engine 114 distributes collection of voice data to untrained speakers who provide utterances into the mobile application, process, etc. executing on the NLP training device(s) 104. The transcription engine 114 may allow providers of an NLP service to create voice data collection campaigns that identify NLP utterances to be collected from the speakers. A "voice data collection campaign," as described herein, may refer to an instance of an effort to collect voice data for specific utterances.

The transcription engine 114 may provide each of the NLP training device(s) 104 with a session script that guides the speakers through a series of utterances represented in the voice data collection campaigns. A "session script," as described herein, may refer to a script that provides an NLP trainer with one or more prompts into which the NLP trainer can provide voice data in response to text of utterances. The transcription engine 114 may further collect voice data related to those utterances. The voice data may be stored along with text of the utterances in a transcription datastore that is used for crowdsourced transcription jobs, crowdsourced validation jobs, and/or other processes described herein. FIG. shows the transcription engine 114 in greater detail.

The validation engine 116 may manage validation of transcriptions of voice data during a training phase of the natural language processing environment 100. In various implementations, the validation engine 116 provides validation jobs and/or validation job scoring data to the validation device(s) 110. The validation engine 116 may further receive validation job outcomes from the validation device(s) 110. The validation engine 116 may store validated transcription data in a validated transcription data datastore. The validated transcription data datastore may be used during an end-user deployment phase of the natural language processing environment 100. The validation engine 116 may correspond to the validation engine described in U.S. patent application Ser. No. 14/846,935, entitled, "System and Method for Validating Natural Language Content Using Crowdsourced Validation Jobs."

The end-user deployment engine 118 may provide natural language transcription services to the NLP end-user device(s) 102 during an end-user deployment phase of the natural language processing environment 100. In various implementations, the end-user deployment engine 118 uses a validated transcription data datastore. Transcriptions in the validated transcription data datastore may have been initially transcribed by the transcription device(s) 106 and the transcription engine 114, and validated by the validation device(s) 110 and the validation engine 116.

Though FIG. 1 shows the NLP end-user device(s) 102, the NLP training device(s) 104, the transcription device(s) 106, and the validation device(s) 110 as distinct sets of devices, it is noted that in various implementations, one or more of the NLP end-user device(s) 102, the NLP training device(s) 104, the transcription device(s) 106, and the validation device(s) 110 may reside on a common set of devices. For example, in some implementations, devices used as the basis of the transcription device(s) 106 may correspond to devices used as the basis of the NLP training device(s) 104. In these implementations, people may use a digital device configured: as an NLP training device(s) 104 to provide voice data, and as a transcription device(s) 106 to transcribe voice data provided by other people.

The Structures of the Transcription Engine 114

Figure 2:
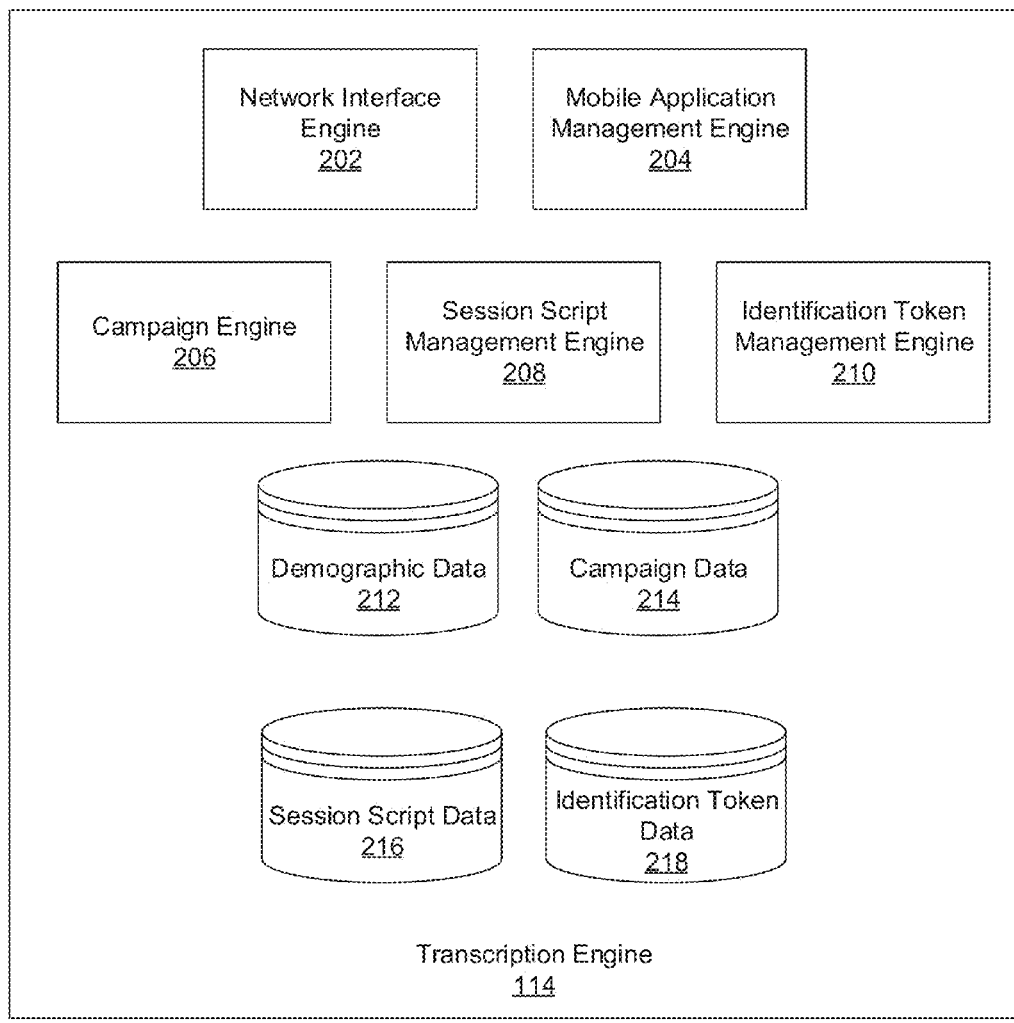
FIG. 2 illustrates a block diagram of a transcription engine, according to some implementations.

FIG. 2 illustrates a block diagram of a transcription engine 114, according to some implementations. The transcription engine 114 may include a network interface engine 202, a mobile application management engine 204, a campaign engine 206, a session script management engine 208, an identification token management engine 210, a demographic data datastore 212, a campaign data datastore 214, a session script data datastore 216, and an identification token data datastore 218. One or more of the network interface engine 202, the mobile application management engine 204, the campaign engine 206, the session script management engine 208, the identification token management engine 210, the demographic data datastore 212, the campaign data datastore 214, the session script data datastore 216, and the identification token data datastore 218 may be coupled to one another or to modules not shown in FIG. 2.

The network interface engine 202 may be configured to send data to and receive data from the network 108. In some implementations, the network interface engine 202 is implemented as part of a network card (wired or wireless) that supports a network connection to the network 108. The network interface engine 202 may control the network card and/or take other actions to send data to and receive data from the network 108.

The mobile application management engine 204 may be configured to manage a mobile application on the NLP trainer device(s) 104. In some implementations, the mobile application management engine 204 may provide installation instructions (e.g., an executable installation file, a link to an application store, etc.) to the NLP training device(s) 104. The mobile application management engine 204 may instruct a mobile application on the NLP trainer device(s) 104 to render on the screens of the NLP trainer device(s) 104 a sequence of prompts that allow NLP trainers to record utterances that are provided to them. In some implementations, the utterances in the sequence of prompts follow session scripts for a particular NLP trainer. The mobile application management engine 204 may further configure the mobile application in accordance with a voice data collection campaign. For example, the mobile application management engine 204 may use campaign data to configure relevant sound levels, tutorials, session scripts, etc. of the mobile application.

The campaign engine 206 may collect campaign data from the campaign data datastore 214. In some implementations, the campaign engine 206 queries the campaign data datastore 214 for specific items of campaign data for a particular voice data collection campaign. The campaign engine 206 may provide campaign data to the mobile application management engine 204 and/or other modules of the transcription engine 114.

The session script management engine 208 may collect session scripts from the session script data datastore 216. In various implementations, the session script queries the session script data datastore 216 for specific session scripts. The session script management engine 208 may provide the session scripts to the mobile application management engine 204 and/or other modules of the transcription engine 114.

The identification token management engine 210 may manage identification tokens. In some implementations, the identification token management engine 210 gathers identification tokens to and stores identification tokens in the identification token data datastore 218. The identification token management engine 210 may also create identification token using information related to campaign data and/or session scripts. As an example, the identification token management engine 210 may create an identification token that includes a file name of specific campaign data in a first part (e.g., in the first five characters), and includes a file name of specific session scripts in a second part (e.g., in the last four characters). The identification token management engine 210 may provide identification tokens to and/or receive identification tokens from the mobile application management engine 204 and/or other modules of the transcription engine 114.

The demographic data datastore 212 may store demographic data related to NLP trainers. In some implementations, the demographic data datastore 212 may be specified in a demographic file referenced in campaign data stored in the campaign data datastore 214. Demographic data may include usernames, first and last names, addresses, phone numbers, emails, payment information, etc. associated with NLP trainers. Table 1 shows an example of how demographic data in the demographic data datastore 212 may be structured:

TABLE 1

Example of Demographic Data.

| Key | Description | Type | Example | Required? |
|---|---|---|---|---|
| version | Schema version of the demographic file. | Double | 1.0 | Yes |
| data_points | | | | Yes |
| data_points.label | Name of the field. Will be displayed beside the input field. | String | "First name" | Yes |
| data_points.required | Whether the participant is required to provide this information. | Boolean | true\|false | No (True) |
| data_points.type | Used to identify what type of input field to display. 0 = Text field (EditText) 1 = List (Spinner) 2 = Checkboxes 3 = Radio buttons 4 = Switch | Integer | 0\|1\|2\|3\|4 | Yes |
| data_points.hint | A hint of what the participant should input. Only used for type 0. | String | "e.g., Bob" | No |
| data_points.options | Options to populate types 1, 2, and 3. | List<String> | ["Male", "Female", "Other"] | Yes, if type is 1, 2, or 3. |
| data_points.default | Whether the Switch should be set to true or false by default. | Boolean | true\|false | Yes, if type is |

The campaign data datastore 214 may store campaign data. The campaign data may comprise a file compatible with JavaScript Object Notation (JSON) or other relevant format. Each item of campaign data may be identified with campaign code, e.g., an alphanumeric string that can be used to download a file corresponding to the campaign data. In various implementations, the campaign data includes information related to configuring the mobile application on the NLP training device(s) 104 to record voice data. The campaign data may include, for instance, definitions of different sound levels that may be used by the mobile application on the NLP training device(s) 104 during prompt recording and/or audio calibration processes. Table 2 shows an example of how the campaign data in the campaign data datastore 214 may be structured:

TABLE 2

Example of Campaign Data.

| Key | Description | Type | Example | Required (Default) |
|---|---|---|---|---|
| version | Schema version of the settings file. | Double | 1.0 | Yes |
| id | Same as the filename. Used to easily identify the settings file. | String | "ao9hz3" | Yes |
| db_levels | Defines the different decibels levels to be used by the VU meter during prompt recording and calibration. | | | Yes |
| db_levels.min | The minimum decibel level. | Double | 0 | Yes |
| db_levels.grn_max_ylw_min | The maximum decibel level for the green range and the minimum for the yellow. | Double | 10.5 | Yes |
| db_levels.ylw_max_red_min | The maximum decibel level for | Double | 20 | Yes |

TABLE 2-continued

Example of Campaign Data.

| Key | Description | Type | Example | Required (Default) |
|---|---|---|---|---|
| | the yellow range and the minimum for the red. | | | |
| db_levels.max | The maximum decibel level. | Double | 30 | Yes |
| tutorial | Name of the .tut file to download tutorials from S3. Exclude to skip tutorials. Should not contain spaces. | String | "test_tut" | No |
| demographic | Name of the .dem file to download demographic options from S3. Exclude to skip demographic. Should not contain spaces. | String | "test_dem" | No |
| session_script_dir | Name of folder within jibe.data/sessions.scripts in which campaign's session scripts are kept. | String | "test_campaign" | |
| number_of_sessions | The number of sessions [1-n] a participant can do. | Integer | 1 | Yes |
| duplicate_sessions | Whether a device can repeat a session. Should be true if a device is shared. | Boolean | true\|false | Yes |
| do_calibration | Whether the calibration screen should be displayed. | Boolean | true\|false | No (False) |
| external_storage | Whether temporary, completed, and zip files should be saved in the app's internals storage (more secure) or external folder. If external, a Jibe folder will be created. | Boolean | true\|false | No (False) |
| failed_audits_threshold | Total number of failed audits a given device is allowed. If a device's total equals this value, device will not be able to continue with campaign. | Integer | 10 | No |
| upload | Whether to automatically upload audio files and other information. | Boolean | true\|false | No (True) |
| generate_completion_code | Whether to generate an 8-digit alphanumerical string at the end of each completed session | Boolean | true\|false | No (False) |
| max_audio_length | The maximum length an audio recording can be, in milliseconds. | Long | 12000 | Yes |

TABLE 2-continued

Example of Campaign Data.

| Key | Description | Type | Example | Required (Default) |
|---|---|---|---|---|
| silence | Silence to precede and following each audio recording | | | No |
| silence.leading | Duration of silence prepending the audio recording, in milliseconds. Default is 500 | Long | 1000 | No (500) |
| silence.trailing | Duration of silence to append the audio recording, in milliseconds. Default is 1000 | Long | 5000 | No (500) |

The session script data datastore 216 may store data related to session scripts. More particularly, in various implementations, the session script data datastore 216 may store information related to the specific sequence of screens used on one of the NLP training device(s) 104 to collect voice data. Table 3 shows an example of how the data related to session scripts in the session script data datastore 216 may be structured:

TABLE 3

Example of Data Related to Session Scripts

| Key | Description | Data Type | Example | Required? |
|---|---|---|---|---|
| version | Schema version of the .ss file. | Double | 1.2 | Yes |
| id | A unique 12 character alphanumerical string used to identify the session script. | String | "5C3D6D4E2981" | Yes |
| name | Name given to the session. This won't be displayed to the participant. Used for internal use. | String | "POI - Seattle - WA - USA" | Yes |
| language-culture | Language-culture information about the script. This will not be used by Jibe but for post-processing. | String | "en-us" | No |
| prompts | Array that contains a list of Prompts. | List<Prompt> | "en-us" | Yes |
| audio_config | Configurations for all the audio files generated during the session. If this field is missing, the app will use the defaults provided below. | List<Prompt> | | No |
| audio_config.sample_rate | The sample rate for the audio recording. Default is 16000 | Integer | 16000 | Yes |
| audio_config.format | The format for the audio | String | "WAV"|"RAW"| "PCM" | Yes |

TABLE 3-continued

Example of Data Related to Session Scripts

| Key | Description | Data Type | Example | Required? |
|---|---|---|---|---|
| | recording. Default is "WAV". | | | |
| audio_config.channel | Integer representing mono or stereo. Default is 1 | Integer | 1 = Mono<br>2 = Stereo | Yes |
| audio_config.bit_rate | The bit rate for the recording. Default is 8. | Integer | 16 | Yes |

The identification token data datastore 218 may store identification tokens. In various implementations, each identification token may comprise an alphanumeric string that contains therein identifiers of campaign data and session script data. As an example, identification tokens in the identification token data datastore 218 may comprise a nine character alphanumeric string. In these implementations, the four characters of an identification token may correspond to a campaign code for a specific campaign data. Moreover, the last five characters of an identification token may correspond to the first five characters of a filename of session script data.

The Natural Language Processing Environment 100 in Operation

The natural language processing environment 100 may operate to collect voice data using campaign data and session scripts delivered to the NLP training device(s) 104, as discussed further herein. The natural language processing environment 100 may also operate to transcribe voice data into text, and validate transcriptions of voice data as discussed further herein. As discussed herein, the natural language processing environment 100 may operate to support an end-user deployment phase in which voice data from NLP end users is collected and transcribed by validated transcription libraries. The natural language processing environment 100 may also operate to support a training phase in which voice data is gathered through campaign data and session scripts, and assembled into transcription libraries.

Operation when Collecting Voice Data Pursuant to a Voice Data Collection Campaign The natural language processing environment 100 may operate to collect voice data pursuant to voice data collection campaigns provided to the NLP training device(s) 104 and managed by the transcription engine 114. A mobile application on the NLP training device(s) 104 may present NLP trainer(s) with a series of prompts that display utterances in accordance with the voice data collection campaigns and/or session scripts. The NLP trainers may use the series of prompts to provide voice data that corresponds to text related to the voice data collection campaigns.

Figure 3:
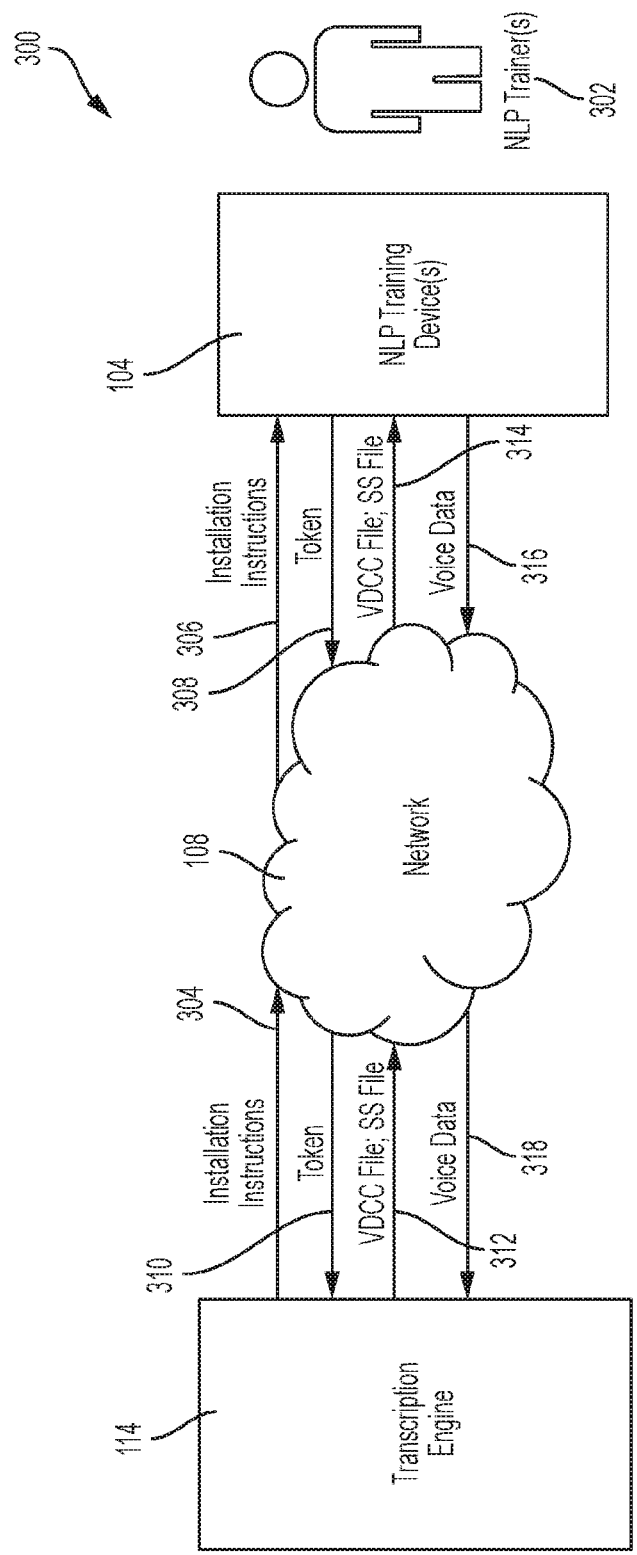
FIG. 3 illustrates a block diagram of an example of a data flow relating to operation of the natural language processing environment during the training phase, according to some implementations.

FIG. 3 illustrates a block diagram of an example of a data flow 300 relating to operation of the natural language processing environment 100 during the training phase, according to some implementations. FIG. 3 includes the transcription engine 114, the network 108, the NLP training device(s) 104, and an NLP trainer 302.

The transcription engine 114 may receive and/or store a voice data collection campaign file. The transcription engine 114 may also receive and/or store a session script file that is sent to and/or stored in the transcription engine 114. In various implementations, the transcription engine 114 creates identification tokens that identify the voice data collection campaign file and the session script file. As an example, the transcription engine 114 may create nine character identification tokens of which a first part (e.g., the first five characters) represent a voice data collection campaign file and of which a second part (e.g., the last four characters) represent a session script file. The transcription engine 114 may include the identification token into installation instructions, and may incorporate the installation instructions into a network-compatible transmission.

At an operation 304, the transcription engine 114 may send the network-compatible transmissions to the network 108. At an operation 306, the NLP training device(s) 104 may receive the installation instructions. In response to the installation instructions, the NLP training device(s) 104 may install and/or configure a mobile application that supports gathering voice data. The mobile application may specify identification tokens related to particular voice data collection campaign and session scripts to be assigned to the NLP trainer(s) 302. The NLP training device(s) 104 may incorporate the identification token into a network-compatible transmission.

When the NLP trainer 302 accesses the mobile application on the NLP training device(s) 104, one or more of the identification tokens may be returned to the transcription engine 114. At an operation 308, the NLP training device(s) 104 may provide the network-compatible transmission to the network 108. At an operation 310, the transcription engine 114 may receive the network-compatible transmission.

The one or more identification tokens may be used to look up a voice data collection campaign and session scripts for the NLP trainer 302. In some implementations, the transcription engine 114 parses the identification token. The transcription engine 114 may identify a file corresponding to a voice data collection campaign from a first part of the file. The transcription engine 114 may also identify a file corresponding to session scripts from a second part of the file. The transcription engine 114 may incorporate the file corresponding to a voice data collection campaign or a link to the file corresponding to a voice data collection campaign into a network-compatible transmission. The transcription engine 114 may also incorporate the file corresponding to the session scripts or a link to the file corresponding to the session scripts into the network-compatible transmission. At an operation 312, the transcription engine 114 may provide the network-compatible transmissions to the network 108.

At an operation 314, the NLP training device(s) 104 may receive the network-compatible transmission. Using the voice data collection campaign and the session scripts, the NLP training device(s) 104 may be guided through a series of prompts that specify utterances for which voice data is to be collected. More specifically, each prompt may provide the NLP trainer(s) 302 with one or more utterances to be recorded. Each prompt may provide the NLP trainer(s) 302 with the ability to erase, record, control recording parameters, etc. The NLP training device(s) 104 may capture voice data from the NLP trainer(s) 302.

The NLP training device(s) 104 may further incorporate the voice data into a network-compatible transmission, that, at an operation 316, is provided to the network 108. At an operation 318, the transcription engine 114 receives the network-compatible transmission. The transcription engine 114 may store the voice data along with the text corresponding to the voice data in one or more transcription libraries used for the end-user deployment phase.

Operation when Implementing an End-User Deployment Phase

The natural language processing environment 100 may operate to transcribe voice data from end-users during an end-user deployment phase. In the end-user deployment phase, NLP end-user device(s) 102 may provide voice data over the network 108 to the transcription validation server 112. The end-user deployment engine 118 may use trained transcription libraries that were created during the training phase of the natural language processing environment 100 to provide validated transcription data to the NLP end-user device(s) 102. In an implementation, the NLP end-user device(s) 102 streams the voice data to the transcription validation server 112, and the end-user deployment engine 118 returns real-time transcriptions of the voice data to the NLP end-user device(s) 102.

Figure 4:
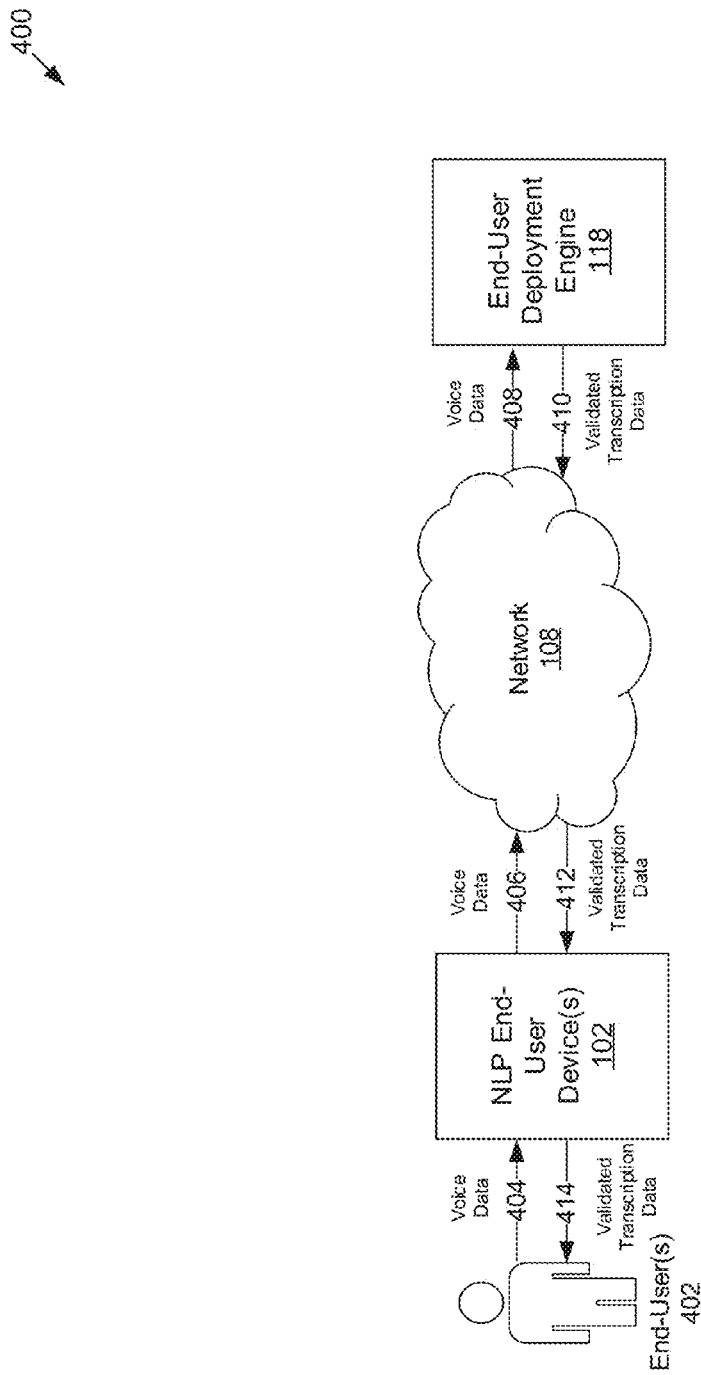
FIG. 4 illustrates a block diagram of an example of a data flow relating to operation of the natural language processing environment during the end-user deployment phase, according to some implementations.

FIG. 4 illustrates a block diagram of an example of a data flow 400 relating to operation of the natural language processing environment 100 during the end-user deployment phase, according to some implementations. FIG. 4 includes end-user(s) 402, the NLP end-user device 102, the network 108, and the end-user deployment engine 118.

At an operation 404, the end-user(s) 402 provide voice data to the NLP end-user device(s) 102. The NLP end-user device(s) 102 may capture the voice data using an audio input device thereon. The NLP end-user device(s) 102 may incorporate the voice data into network-compatible data transmissions, and at an operation 406, may send the network-compatible data transmissions to the network 108.

At an operation 408, the end-user deployment engine 118 may receive the network-compatible data transmissions. The end-user deployment engine 118 may further extract and transcribe the voice data using trained transcription libraries stored in the end-user deployment engine 118. More specifically, the end-user deployment engine 118 may identify validated transcription data corresponding to the voice data in trained transcription libraries. The end-user deployment engine 118 may incorporate the validated transcription data into network-compatible data transmissions. At an operation 410, the end-user deployment engine 118 may provide the validated transcription data to the network 108.

At an operation 412, the NLP end-user device(s) 102 may receive the validated transcription data. The NLP end-user device(s) 102 may further extract the validated transcription data from the network-compatible transmissions. At an operation 414, the NLP end-user device(s) 102 provide the validated transcription data to the end-user(s) 402. In some implementations, the NLP end-user device(s) 102 display the validated transcription data on a display component (e.g., a screen). The NLP end-user device(s) 402 may also use the validated transcription data internally (e.g., in place of keyboard input for a specific function or in a specific application/document).

Operation when Gathering Transcription Data in a Training Phase

The natural language processing environment 100 may operate to gather voice data from NLP trainers during a training phase. More particularly, in a training phase, NLP trainers provide the NLP training device(s) 104 with voice data. The voice data may comprise words, syllables, and/or combinations of words and/or syllables that are commonly appear in a particular language. In some implementations, the NLP trainers use a mobile application on the NLP training device(s) 104 to input the voice data. In the training phase, the NLP training device(s) 104 may provide the voice data to the transcription engine 114. The transcription engine may provide the voice data to the transcription device(s) 106. In some implementations, the transcription engine provides the voice data as part of crowdsourced transcription jobs to transcribers. Transcribers may use the transcription device(s) 106 to perform these crowdsourced transcription jobs. The transcription device(s) 106 may provide the transcription data to the transcription engine 114. In various implementations, the transcription data is validated and/or used in an end-user deployment phase, using the techniques described herein.

Figure 5:
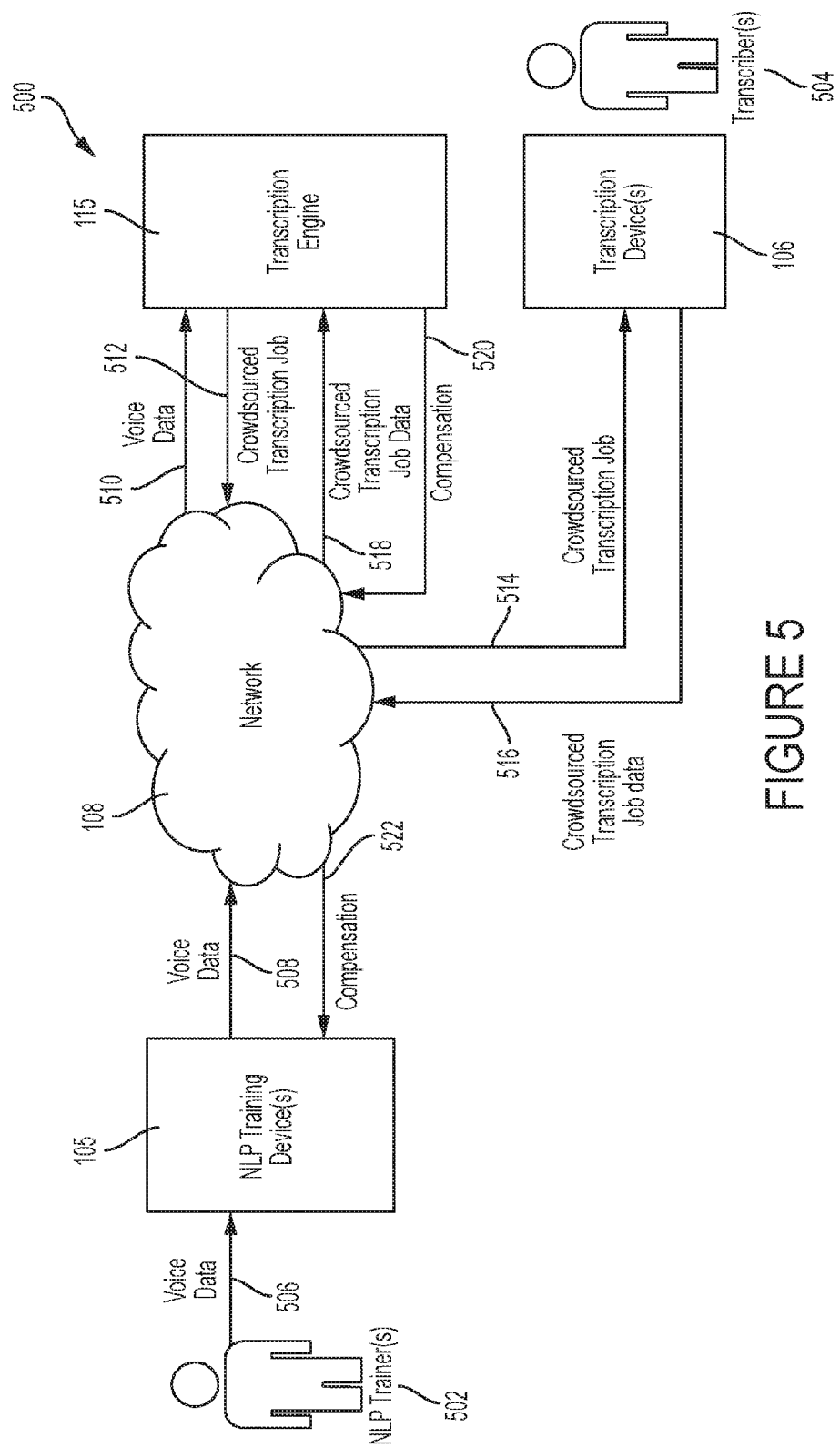
FIG. 5 illustrates a block diagram of an example of a data flow relating to transcription of voice data by the natural language processing environment during the training phase, according to some implementations.

FIG. 5 illustrates a block diagram of an example of a data flow 500 relating to transcription of voice data by the natural language processing environment 100 during the training phase, according to some implementations. FIG. 5 includes NLP trainer(s) 502, the NLP training device(s) 104, the network 108, the transcription engine 114, the transcription device(s) 106, and transcriber(s) 504.

At an operation 506, the NLP trainer(s) 502 provide voice data to the NLP training device(s) 104. The NLP training device(s) 104 may capture the voice data using an audio input device thereon. A first mobile application may facilitate capture of the voice data. The NLP training device(s) 104 may incorporate the voice data into network-compatible data transmissions, and at an operation 508, may send the network-compatible data transmissions to the network 108. In some implementations, the NLP trainer(s) 502 receive compensation (inducements, incentives, payments, etc.) for voice data provided into the first mobile application.

At an operation 510, the transcription engine 114 may receive the network-compatible data transmissions. The transcription engine 114 may incorporate the crowdsourced transcription jobs into network-compatible data transmissions, and at an operation 512, may send the network-compatible data transmissions to the network 108.

At an operation 514, the transcription device(s) 106 may receive the network-compatible data transmissions from the network 108. The transcription device(s) 106 may play the voice data to the transcriber(s) 504 on a second mobile application. In an implementation, the transcription device(s) 106 play an audio recording of the voice data and ask the transcriber(s) 504 to return text corresponding to the voice data. The transcription device(s) 106 may incorporate the text into crowdsourced transcription job data that is incorporate into network compatible data transmissions, which in turn is sent, at operation 516, to the network 108. In some implementations, the transcriber(s) 504 receive compensation (inducements, incentives, payments, etc.) for transcribing voice data.

At an operation 518, the transcription engine 114 receive the network-compatible transmissions. The transcription engine 114 may extract crowdsourced transcription job data from the network-compatible transmissions and may store the voice data and the text corresponding to the voice data as unvalidated transcription data. In various implementations, the unvalidated transcription data is validated by crowdsourced validation jobs as discussed herein.

The transcription engine 114 may identify compensation for transcribing the voice data successfully. The transcription engine 114 may format compensation to the NLP trainer(s) 502 into network-compatible data transmissions, and at operation 520, may send the network-compatible data transmissions to the network 108. At operation 522, the NLP training device(s) 522 may receive the network-compatible data transmissions having the compensation.

Figure 6:
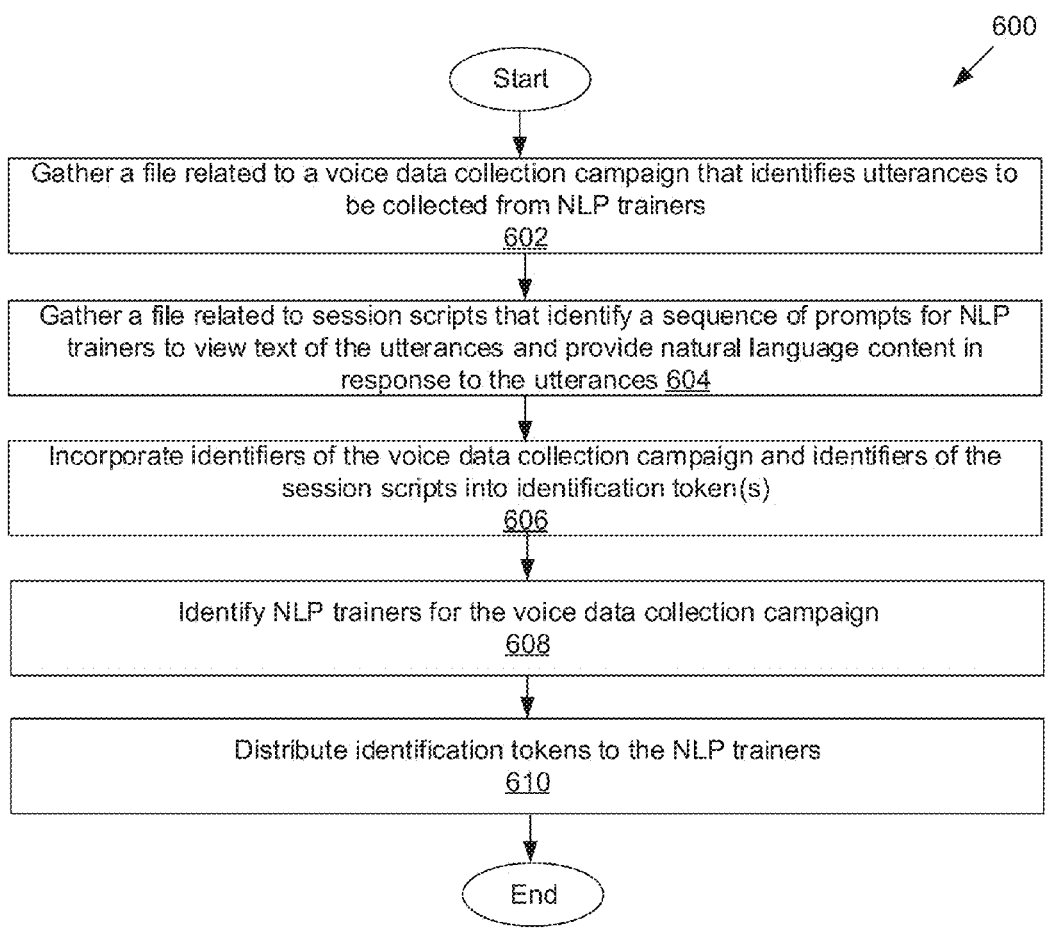
FIG. 6 illustrates a flowchart of a process for collecting voice data for a voice data collection campaign, according to some implementations.

FIG. 6 illustrates a flowchart of a process 600 for collecting voice data for a voice data collection campaign, according to some implementations. The process 600 is discussed in conjunction with the transcription engine 114 discussed herein. It is noted other structures may perform the process 600, and that the process 600 may include more or less operations than explicitly shown in FIG. 6.

At an operation 602, a file for a voice data collection campaign may be gathered. The voice data collection campaign may identify utterances to be collected from one or more NLP trainers. In some implementations, the campaign engine 206 gathers campaign data from the campaign data datastore 214. As discussed herein, the file may comprise a JSON file. The campaign data may identify a set of raw utterances that are to be collected from NLP trainers. As an example, the voice data collection campaign may specify syllables, words, phrases, etc. that are to be read and recorded by NLP trainers into a mobile application on the NLP training device(s) 104. The campaign data may specify other information, such as recording parameters, etc.

At an operation 604, a file related to one or more session scripts may be gathered. The session scripts may identify a sequence of prompts for NLP trainers to view text of the utterances and provide natural language content in response to the utterances. In various implementations, the session script management engine 208 gathers session scripts from the session script data datastore. Each of the session scripts may identify a sequence of prompts for NLP trainers to view text of the utterances and provide natural language content in response to the utterances, as discussed further herein.

At an operation 606, identifiers of the voice data collection campaign and identifiers of the session scripts may be incorporated into one or more identification token. In various implementations, the identification token management engine 210 creates one or more identification token using file names of campaign data and file names of session scripts. As discussed herein, the one or more identification tokens may comprise an alphanumeric character string that incorporates the file names of campaign data and file names of session scripts therein.

At an operation 608, NLP trainers for the voice data collection campaign may be identified. In various implementations, the mobile application management engine 204 receives notifications related to people who have installed a mobile application on one of the NLP training device(s) 104 and want to provide voice data. At an operation 610, identification tokens may be distributed to the NLP trainers. The mobile application management engine 204 may gather from the identification token management engine 210 identification tokens to be provided to the identified NLP trainers. The mobile application management engine 204 may distribute these identification tokens in any known or convenient manner, e.g., over the network 108.

Figure 7:
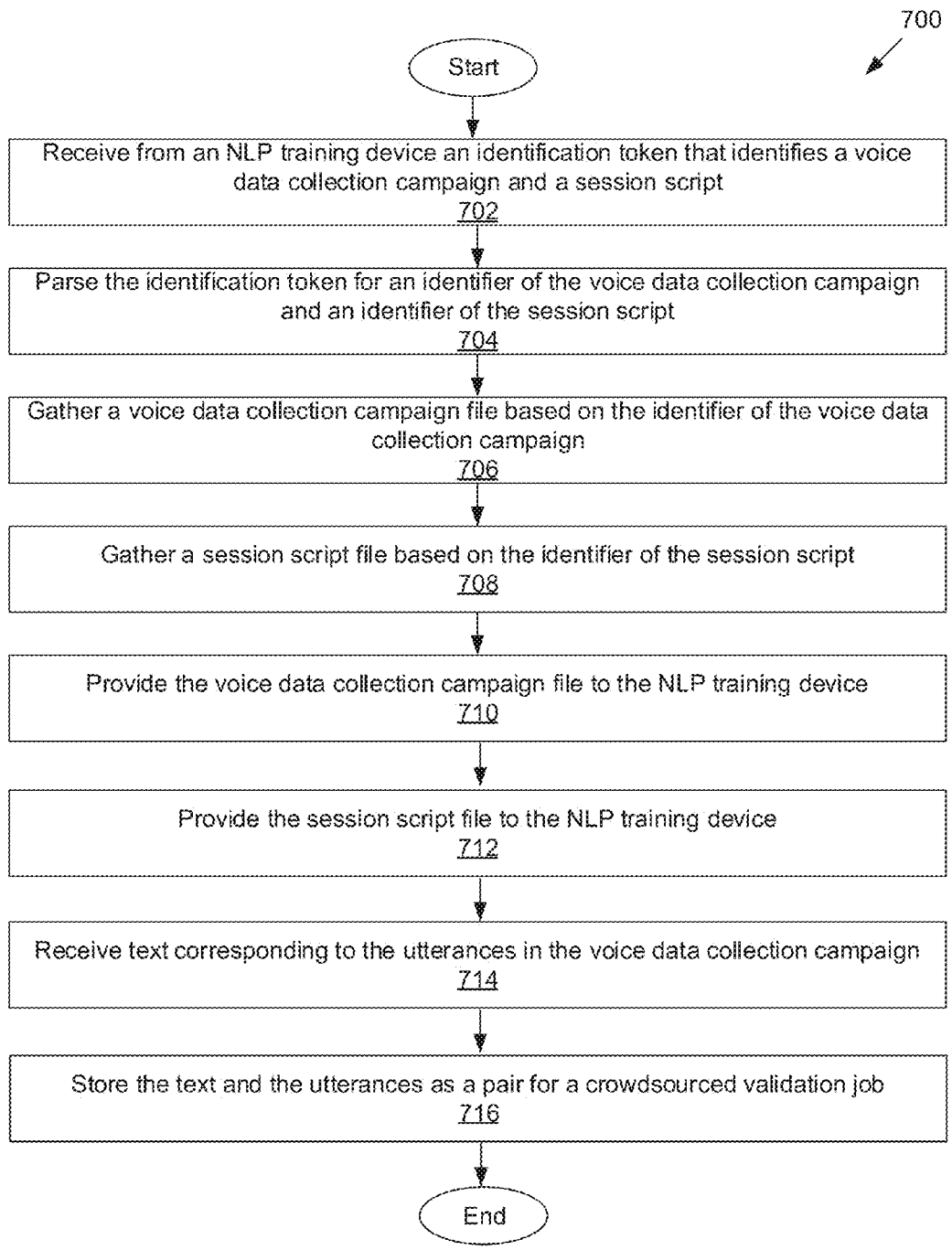
FIG. 7 illustrates a flowchart of a process for creating and distributing identification tokens for a natural language training process, according to some implementations.

FIG. 7 illustrates a flowchart of a process 700 for creating and distributing identification tokens for a natural language training process, according to some implementations. The process 700 is discussed in conjunction with the transcription engine 114 discussed herein. It is noted other structures may perform the process 700, and that the process 700 may include more or less operations than explicitly shown in FIG. 7.

At an operation 702, an identification token that identifies a voice data collection campaign and a session script may be received from an NLP training device. In various implementations, the mobile application management engine 204 may receive an identification token from the NLP training device(s) 104 over the network 108. The identification token may comprise a character string that identifies a voice data collection campaign and a session script. As an example, the identification token may comprise a first portion that specifies a file name associated with a voice data collection campaign and a second portion that specifies a file name associated with a session script. The mobile application management engine 204 may provide the identification token to the identification token management engine 210.

At an operation 704, the identification token may be parsed for an identifier of the voice data collection campaign and an identifier of the session script. For example, the identification token management engine 210 may identify a first portion (e.g., the first five characters) of the identification token that corresponds to a filename of a voice data collection campaign file. The identification token management engine 210 may also identify a second portion (e.g., the last four characters) of the identification token that corresponds to a filename of a session script.

At an operation 706, a voice data collection campaign file may be gathered based on the identifier of the voice data collection campaign. More specifically, the campaign engine 206 may gather from the campaign data datastore 214 a voice data collection campaign file based on the identifier of the voice data collection campaign. At an operation 708, a session script file may be gathered based on the identifier of the session script. In various implementations, the session script management engine 208 gathers from the session script data datastore 216 a session script file based on the identifier of the session script.

At an operation 710, the voice data collection campaign file is provided to the NLP training device. At an operation 712, Provide the session script file to the NLP training device. The mobile application management engine 204 may format the voice data collection campaign file and/or the session script file in a format that can be provided to the mobile application on the NLP training device(s) 104. The network interface engine 202 may format the voice data collection campaign file and/or the session script file into network-compatible transmissions.

Figure 8:
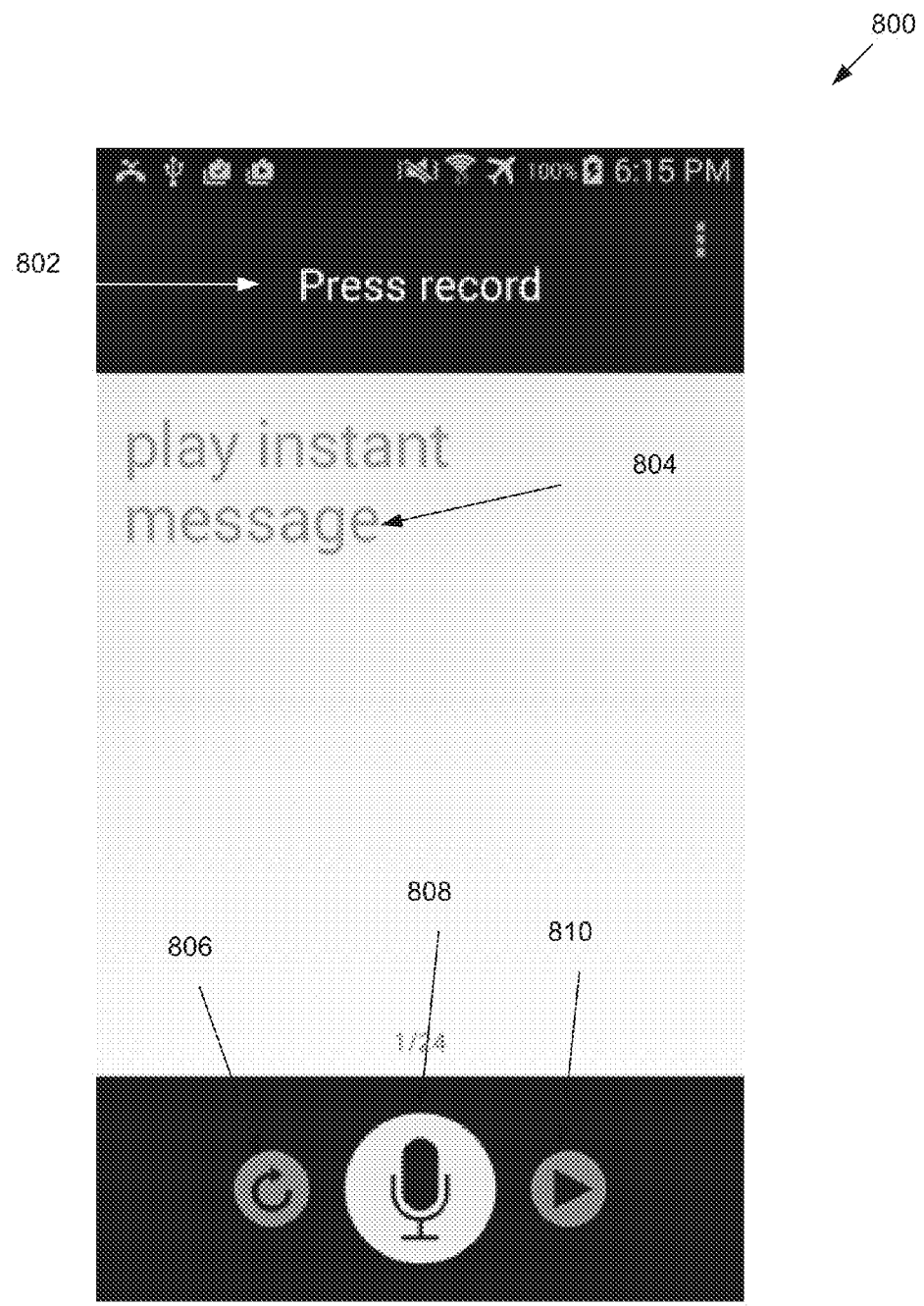
FIG. 8 illustrates a screenshot of a screen of a mobile application of one of the NLP training device(s), according to some implementations.

At an operation 714, text corresponding to the utterances in the voice data collection campaign may be received. The network interface engine 202 and/or the mobile application management engine 204 may receive text corresponding to the utterances in the voice data collection campaign. At an operation 716, the text and the utterances may be stored as pairs for a crowdsourced validation job FIG. 8 illustrates a screenshot 800 of a screen of a mobile application of one of the NLP training device(s) 104, according to some implementations. The screen in FIG. 8 may include a recording banner 802, a display area 804, an erase button 806, a record button 808, and a play button 810. In various implementations, the recording banner 802 and the display area 804 may display one or more predetermined prompts to an NLP trainer during a training phase of the natural language processing environment 100. The erase button 806 may allow the NLP trainer to erase voice data that the NLP trainer has previously recorded. The record button 808 may allow the NLP trainer to record voice data. The play button 810 may allow the NLP trainer to play voice that that the NLP trainer has recorded.

In some implementations, the screen in FIG. 8 is provided to an NLP trainer as part of a training phase of the natural language processing environment 100. More specifically, when an NLP trainer logs into the mobile application, the NLP trainer may receive a unique identification token than is mapped to a specific collection of prompts and audits to be used. Upon entering the identification token, the NLP trainer may be guided through an arbitrary number of prompts. The NLP training device(s) 104 may provide the voice data to the transcription engine 114 using the techniques described herein. In some implementations, the NLP trainer may be provided with one or more audits (e.g., gold standard questions, captions that are not machine-readable, audio that is not understandable to machines, etc.). Upon completing a session, the NLP trainer may be provided with a completion code that the NLP trainer can use for a variety of purposes, such as obtaining compensation for the jobs the NLP trainer has performed.

Figure 9:
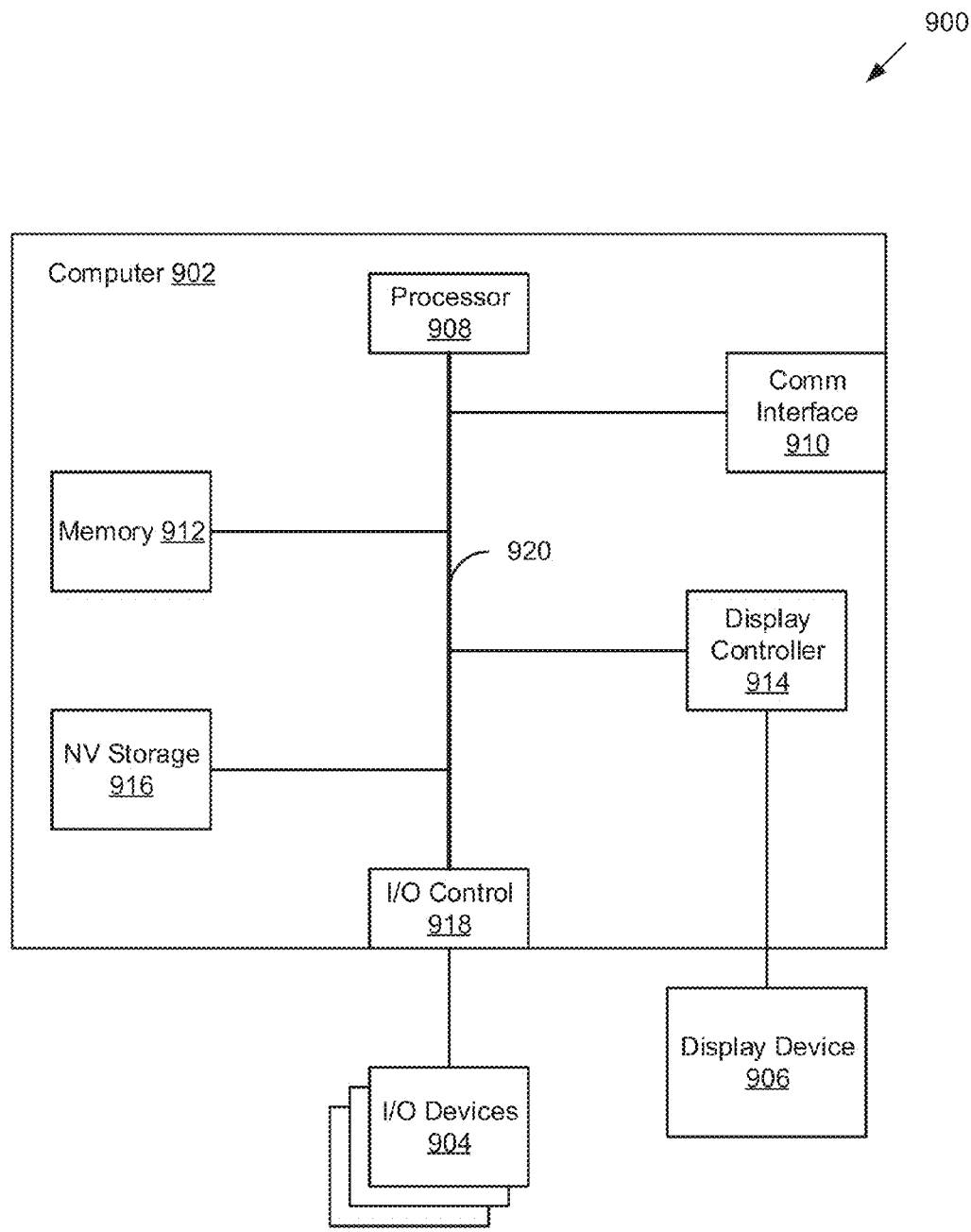
FIG. 9 shows an example of a computer system, according to some implementations.

FIG. 9 shows an example of a computer system 900, according to some implementations. In the example of FIG. 9, the computer system 900 can be a conventional computer system that can be used as a client computer system, such as a wireless client or a workstation, or a server computer system. The computer system 900 includes a computer 902, I/O devices 904, and a display device 906. The computer 902 includes a processor 908, a communications interface 910, memory 912, display controller 914, non-volatile storage 916, and I/O controller 918. The computer 902 can be coupled to or include the I/O devices 904 and display device 906.

The computer 902 interfaces to external systems through the communications interface 910, which can include a modem or network interface. It will be appreciated that the communications interface 910 can be considered to be part of the computer system 900 or a part of the computer 902. The communications interface 910 can be an analog modem, ISDN modem, cable modem, token ring interface, satellite transmission interface (e.g. "direct PC"), or other interfaces for coupling a computer system to other computer systems.

The processor 908 can be, for example, a conventional microprocessor such as an Intel Pentium microprocessor or Motorola power PC microprocessor. The memory 912 is coupled to the processor 908 by a bus 920. The memory 912 can be Dynamic Random Access Memory (DRAM) and can also include Static RAM (SRAM). The bus 920 couples the processor 908 to the memory 912, also to the non-volatile storage 916, to the display controller 914, and to the I/O controller 918.

The I/O devices 904 can include a keyboard, disk drives, printers, a scanner, and other input and output devices, including a mouse or other pointing device. The display controller 914 can control in the conventional manner a display on the display device 906, which can be, for example, a cathode ray tube (CRT) or liquid crystal display (LCD). The display controller 914 and the I/O controller 918 can be implemented with conventional well known technology.

The non-volatile storage 916 is often a magnetic hard disk, an optical disk, or another form of storage for large amounts of data. Some of this data is often written, by a direct memory access process, into memory 912 during execution of software in the computer 902. One of skill in the art will immediately recognize that the terms "machine-readable medium" or "computer-readable medium" includes any type of storage device that is accessible by the processor 908 and also encompasses a carrier wave that encodes a data signal.

The computer system 900 is one example of many possible computer systems which have different architectures. For example, personal computers based on an Intel microprocessor often have multiple buses, one of which can be an I/O bus for the peripherals and one that directly connects the processor 908 and the memory 912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 912 for execution by the processor 908. A Web TV system, which is known in the art, is also considered to be a computer system, but it can lack some of the features shown in FIG. 9, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program can be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the implementations is intended to be illustrative, but not limiting, of the scope, which is set forth in the claims recited herein.

What is claimed is:

1. A computer-implemented method, the method being implemented in a computer system having one or more physical processors programmed with computer program instructions that, when executed by the one or more physical processors, cause the computer system to perform the method, the method comprising:
   receiving from a natural language processing training device an identification token containing a first portion and a second portion, the first portion identifying a first file for a voice data collection campaign, and the second portion identifying a second file for a session script, the session script supporting a mobile application on the natural language processing training device;
   using the first file and the second file to configure the mobile application to display a sequence of screens, each of the sequence of screens containing text of at least one utterance specified in the voice data collection campaign;
   receiving voice data from the natural language processing training device in response to user interaction with the text of the at least one utterance; and
   storing the voice data and the text of the at least one utterance in a transcription library.

2. The method of claim 1, further comprising:
   gathering a first filename corresponding to the first file;
   gathering a second filename corresponding to the second file; and
   creating the identification token using the first filename and the second filename.

3. The method of claim 1, wherein the identification token comprises an alphanumeric character string.

4. The method of claim 1, wherein the identification token comprises a concatenation of the first portion and the second portion.

5. The method of claim 1, wherein one or more of the first file and the second file comprises a JavaScript Object Notation (JSON) file.

6. The method of claim 1, wherein the utterance comprises one or more of a syllable, a word, a phrase, or a variant thereof.

7. The method of claim 1, wherein the user interaction comprises a selection of a touch-screen button instructing the mobile application to record the voice data.

8. The method of claim 1, wherein the natural language processing training device comprises one or more of a mobile phone, a tablet computing device, a laptop, and a desktop.

9. The method of claim 1, wherein the voice data collection campaign is configured to collect demographic information related to a user of the natural language processing training device.

10. A system comprising:
    a memory;
    one or more physical processors programmed with one or more computer program instructions which, when executed, cause the one or more physical processors to:
    receive from a natural language processing training device an identification token containing a first portion and a second portion, the first portion identifying a first file for a voice data collection campaign, and the second portion identifying a second file for a session script, the session script supporting a mobile application on the natural language processing training device;
    use the first file and the second file to configure the mobile application to display a sequence of screens, each of the sequence of screens containing text of at least one utterance specified in the voice data collection campaign;
    receive voice data from the natural language processing training device in response to user interaction with the text of the at least one utterance; and
    store the voice data and the text of the at least one utterance in a transcription library.

11. The system of claim 10, wherein the instructions cause the one or more physical processors to:
    gather a first filename corresponding to the first file;
    gather a second filename corresponding to the second file; and
    create the identification token using the first filename and the second filename.

12. The system of claim 10, wherein the identification token comprises an alphanumeric character string.

13. The system of claim 10, wherein the identification token comprises a concatenation of the first portion and the second portion.

14. The system of claim 10, wherein one or more of the first file and the second file comprises a JavaScript Object Notation (JSON) file.

15. The system of claim 10, wherein the utterance comprises one or more of a syllable, a word, a phrase, or a variant thereof.

16. The system of claim 10, wherein the user interaction comprises a selection of a touch-screen button instructing the mobile application to record the voice data.

17. The system of claim 10, wherein the natural language processing training device comprises one or more of a mobile phone, a tablet computing device, a laptop, and a desktop.

18. The system of claim 10, wherein the voice data collection campaign is configured to collect demographic information related to a user of the natural language processing training device.

19. A computer program product comprising:
- one or more tangible, non-transitory computer-readable storage devices;
- program instructions, stored on at least one of the one or more tangible, non-transitory computer-readable tangible storage devices that, when executed, cause a computer to:
- receive from a natural language processing training device an identification token containing a first portion and a second portion, the first portion identifying a first file for a voice data collection campaign, and the second portion identifying a second file for a session script, the session script supporting a mobile application on the natural language processing training device;
- use the first file and the second file to configure the mobile application to display a sequence of screens, each of the sequence of screens containing text of at least one utterance specified in the voice data collection campaign;
- receive voice data from the natural language processing training device in response to user interaction with the text of the at least one utterance; and
- store the voice data and the text of the at least one utterance in a transcription library.

* * * * *